US009449005B2

United States Patent
Chen et al.

(10) Patent No.: US 9,449,005 B2
(45) Date of Patent: Sep. 20, 2016

(54) METADATA STORAGE SYSTEM AND MANAGEMENT METHOD FOR CLUSTER FILE SYSTEM

(71) Applicant: Huawei Technologies Co., Ltd., Shenzhen, Guangdong (CN)

(72) Inventors: Zhuo Chen, Shenzhen (CN); Jin Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 14/278,744

(22) Filed: May 15, 2014

(65) Prior Publication Data

US 2014/0250155 A1    Sep. 4, 2014

Related U.S. Application Data

(63) Continuation of application No. PCT/CN2012/084759, filed on Nov. 16, 2012.

(30) Foreign Application Priority Data

Nov. 17, 2011 (CN) .......................... 2011 1 0366559

(51) Int. Cl.
    *G06F 17/30*    (2006.01)
(52) U.S. Cl.
    CPC ... *G06F 17/30091* (2013.01); *G06F 17/30218* (2013.01); *G06F 17/30224* (2013.01)

(58) Field of Classification Search
    CPC ................ G06F 17/30156; G06F 17/30091; G06F 17/30097; G06F 17/30218
    USPC ........................................................ 707/823
    See application file for complete search history.

(56) References Cited

U.S. PATENT DOCUMENTS

| 6,725,392 B1 | 4/2004 | Frey et al. |
| 2007/0094445 A1 | 4/2007 | Trika et al. |
| 2010/0011031 A1 | 1/2010 | Huang et al. |
| 2010/0332846 A1 | 12/2010 | Bowden et al. |
| 2011/0276744 A1 | 11/2011 | Sengupta et al. |

FOREIGN PATENT DOCUMENTS

| CN | 1619522 A | 5/2005 |
| CN | 101814045 A | 8/2010 |
| CN | 101866359 A | 10/2010 |
| CN | 102364474 A | 2/2012 |
| EP | 1 830 270 A1 | 9/2007 |

OTHER PUBLICATIONS

Jing Xing, et al., "Memory based metadata server for cluster file systems", 2008 Seventh International Conference on Grid and Cooperative Computing, Oct. 24, 2008, p. 287-291.

*Primary Examiner* — Mahesh Dwivedi
*Assistant Examiner* — Johnese Johnson

(57) ABSTRACT

The present invention provides a metadata storage system and a management method for a cluster file system. The metadata of the cluster file system is stored by using a DRAM+SSD+HDD three-tier architecture, and the metadata is written sequentially into a metadata buffer in the DRAM based on write-in time. When a metadata buffer fully written, it is written back into the SSD sequentially to form a new metadata storage unit, and corresponding metadata index information in a header structure thereof is stored into the DRAM in a form of a metadata index unit.

17 Claims, 5 Drawing Sheets ns of the SSD, and
may cause fragmentization of the SSD, which has a negative
effect on subsequent I/O operations. In addition, the SSD is
expensive, and a single has a small storage capacity, both of
which may affect usage of the SSD. For the metadata storage
organization structures based on novel memory media like
an NVRAM (Non-Volatile Random Access Memory, non-
volatile random access memory) and a PRAM (Phase-
change RAM, phase-change RAM), if the metadata is stored
separated, stored after compression, or stored jointly with
small files, because the upper layer performs addressing
based on bytes, the access mode is still mainly the small
granularity random I/O, which is not suitable for the SSD,
either.

METADATA STORAGE SYSTEM AND MANAGEMENT METHOD FOR CLUSTER FILE SYSTEM

CROSS-REFERENCE TO RELATED APPLICATIONS

This application is a continuation of International Application No. PCT/CN2012/084759, filed on Nov. 16, 2012, which claims priority to Chinese Patent Application No. 201110366559.2, filed Nov. 17, 2011, both of which are hereby incorporated by reference in their entireties.

TECHNICAL FIELD

The present invention relates to an architecture of a cluster file system, and in particular to metadata storage in a cluster file system and a relevant data migration mechanism.

BACKGROUND

With the development of information technologies, people generate, store, and process more and more data. A file quantity grows significantly with the increase of a data volume, which brings severe challenges to a metadata storage system of a cluster file system based on a conventional dynamic random access memory (Dynamic Random Access Memory, DRAM)+hard disk drive (Hard Disk Drive, HDD) storage architecture.

In the aspect of storage scale, total storage volume of the metadata is continuously growing. The quantity of files that need to be stored in the cluster file system is increasing. Particularly, with the rapid development of Internet applications, files exist in various forms, such as mail, photo, video, and report. With the increase of the total data volume, the quantity of files is growing nearly two times each year, which makes the total metadata volume of the cluster file system expand rapidly. In the aspect of the metadata operation performance, requirements for the performance are also improved gradually. High-performance computation gradually transforms from being CPU-intensive to I/O-intensive. I/O efficiency of the system has an important effect on the performance, which requires the storage system to have very high metadata operation performance. Further, the rapid development of the Internet also leads to higher requirements for the metadata operation performance of a mass storage system.

These challenges make the metadata storage system based on the conventional DRAM+HDD storage architecture fail to meet the requirements. The reason is that, the large total metadata volume makes the DRAM fail to meet all metadata requests, and some metadata I/O requests will be sent to the HDD, while the extremely high I/O delay of the HDD becomes a performance bottleneck of the system.

Compared with the HDD, a solid-state drive SSD (Solid-state Drive) has advantages of higher bandwidth and low delay, but there are also many problems in storing metadata by using the SSD. In the metadata storage organization of the cluster file system based on the conventional DRAM+HDD storage architecture, storage based on a directory tree is adopted or the metadata is stored in a database, which causes that the metadata I/O mode is mainly small granularity random I/O, and such an I/O is not suitable for the SSD. The reason is that, performance of the SSD is affected by the I/O mode, and sequential I/O performance of the SSD is better than random I/O performance. Further, small granu- In an existing SSD storage system designed for a specific load, specific optimization is performed based on the I/O feature of the SSD. For example, a write buffer is used to convert small granularity random write into large granularity sequential write, which gives full play to the performance of the SSD and ensures its service life. However, such a system depends on load characteristics in design and implementation, and is simplified according to the characteristics. Because the metadata storage system of the cluster file system has its own performance requirements and I/O load characteristics, the system cannot be directly applied to the metadata storage, either.

In the existing storage system that adopts DRAM+SSD+HDD three-tier storage, there are generally three design policies: the SSD acts as the buffer of the HDD, the HDD acts as the write buffer of the SSD, and the data is placed into the SSD and the HDD. For the first and third policies, because the SSD may be fast worn by receiving a large number of small granularity random I/Os, the service life of the SSD cannot be ensured. In the second policy in which the HDD acts as the write buffer of the SSD, there are two main problems for the metadata storage application of the cluster file system: First, the data is finally placed into the SSD, and a large number of SSDs are required when the data scale is very large, which increases the system cost; and second, if the HDD acts as the write buffer, some metadata read requests may be sent to the HDD, which significantly increases the metadata read request delay. The read operation is a synchronous operation, and the extremely high read request delay may affect the system performance. Therefore, the second policy cannot meet the requirements of the metadata storage system of the cluster file system, either.

SUMMARY

Therefore, the objective of the present invention is to overcome the defects in the prior art, and provide a metadata storage system and a management method for a cluster file system, which give full play to performance advantages of an SSD and ensure a service life of the SDD while solving a performance bottleneck caused by an HDD.

The objective of the present invention is achieved by using the following technical solution.

In one aspect, the present invention provides a metadata storage system for a cluster file system. The system includes a DRAM and an SDD, where:

the DRAM includes multiple metadata buffers and metadata index units; metadata in each metadata buffer is written sequentially based on write-in time, and each metadata buffer corresponds to a header structure for storing metadata index information of the buffer; a new metadata index unit is formed each time data in the metadata buffer is written back into an SSD, and is used to store the metadata index information included in the header structure of the metadata buffer; and the SSD includes a metadata file, and the metadata file includes multiple metadata storage units organized in a sequence of write-back time; a new metadata storage unit is formed each time the data in the metadata buffer is written back into the SSD, and is configured to store the metadata written from the metadata buffer; and each metadata storage unit corresponds to one metadata index unit in the DRAM.

The foregoing metadata storage system further includes an HDD for storing metadata from the SSD.

In the foregoing metadata storage system, the header structure includes a Bloom Filter and a hash table, where the Bloom Filter is used to record what metadata items are stored in the metadata buffer, and the hash table is used to maintain a mapping between identifiers of the metadata items and offsets of the metadata items in the metadata buffer.

In the foregoing metadata storage system, the SDD further includes a metadata index file for storing the metadata index information; and the DRAM further includes a read buffer module, which is used to buffer metadata read from the SSD.

In another aspect, the present invention provides a metadata management method for the foregoing metadata storage system, where the method includes:

step 1) writing metadata sequentially into a metadata buffer in the DRAM based on write-in time; and step 2) when a metadata buffer is fully written, writing the metadata buffer back into the SSD sequentially to form a new metadata storage unit, and storing corresponding metadata index information in the header structure thereof into the DRAM in a form of a metadata index unit, where the metadata storage unit is organized into a metadata file in a sequence of write-back time.

In the foregoing method, the header structure includes a Bloom Filter and a hash table, the Bloom Filter is used to record what metadata items are stored in the metadata buffer, and the hash table is used to maintain a mapping between identifiers of the metadata items and offsets of the metadata items in the metadata buffer.

In the foregoing method, the step 2) may further include writing the corresponding metadata index information back into a metadata index file on the SSD sequentially when a metadata buffer is written back into the SSD sequentially.

In the foregoing method, the step 2) may further include a step of determining which data items on the SSD are already invalid according to the identifiers of the metadata items in the header structure when the metadata buffer is written back into the SSD; and a step of making an invalid mark for the metadata items in the metadata index units corresponding to the metadata storage units in which the already invalid metadata items are located.

In the foregoing method, the Bloom Filter may be organized in a manner of combining a 64-ary tree and a link, a depth of each 64-ary tree is no more than 2 layers, and multiple 64-ary trees form a linked list, where a Bloom Filter corresponding to a non-leaf node of each 64-ary tree is an exclusive OR result of a Bloom Filter of a child node thereof.

The foregoing method may further include a step of migrating the metadata storage unit from the SSD to the HDD, and this step includes: comparing access heat of the metadata storage unit with a preset threshold to determine whether the metadata storage unit needs to be migrated; and when the access heat of the metadata storage unit is smaller than the preset threshold, migrating the metadata storage unit from the SSD to the HDD, otherwise writing valid metadata items in the metadata storage unit into the metadata buffer in the DRAM;

where the access heat of the metadata storage unit is calculated by using the following formula:

$$HEAT_{i+1} = u \times \frac{K}{NUM} + (1-u) \times HEAT_i ; (0 < u < 1)$$

where $HEAT_{i+1}$ represents current access heat of the metadata storage unit; $HEAT_i$ represents last access heat of the metadata storage unit; u is a value in (0, 1) and is used for controlling effects of the last access heat on the current access heat; K represents times that the metadata storage unit is accessed in a period of time; and NUM represents a number of requests received in the period of time to read the metadata from the SSD; where the threshold is set according to metadata access characteristics.

The foregoing method may further include a step of directly migrating metadata storage units with a ratio of invalid metadata items over 50% from the SSD to the HDD without judging access heat thereof.

In the foregoing method, when a ratio of SSD available space to SSD total space is smaller than a certain space threshold, the step of migrating the metadata storage unit from the SSD to the HDD is performed, where the space threshold ranges between 15% and 20%.

In the foregoing method, the step of migrating the metadata storage unit from the SSD to the HDD is performed at a fixed time interval, and the time interval is no shorter than 30 minutes for an application with a heavy metadata write load.

In another aspect, the present invention provides a cluster file system, where the cluster file system includes the foregoing metadata storage system.

Compared with the prior art, the advantages of the present invention lie in that:

A DRAM+SSD+HDD three-tier architecture is used to store the metadata of the cluster file system, where the metadata is stored in a manner of append write, thereby significantly improving metadata operation performance of the cluster file system. Further, through the data migration method based on access heat, more metadata that is often accessed may be left on the SSD, thereby improving metadata read operation performance.

BRIEF DESCRIPTION OF THE DRAWINGS

The embodiments of the present invention are further described below with reference to the drawings, where.

DETAILED DESCRIPTION

To make the objectives, technical solutions, and advantages of the present invention more comprehensible, the following embodiments further describe the present invention in detail with reference to the accompanying drawings. It should be understood that the specific embodiments described herein are merely used for describing the present invention, and are not intended to limit the present invention.

An embodiment of the present invention provides a metadata storage system for a cluster file system, and the system includes a volatile random memory (such as a DRAM or an SRAM) used as a system memory, a solid-state drive SDD and/or a conventional hard disk drive HDD. The DRAM is adopted to store some auxiliary information of a metadata storage structure, and buffer some metadata to improve performance. The metadata is permanently stored on the SSD, or on the SSD and HDD.

Figure 1:
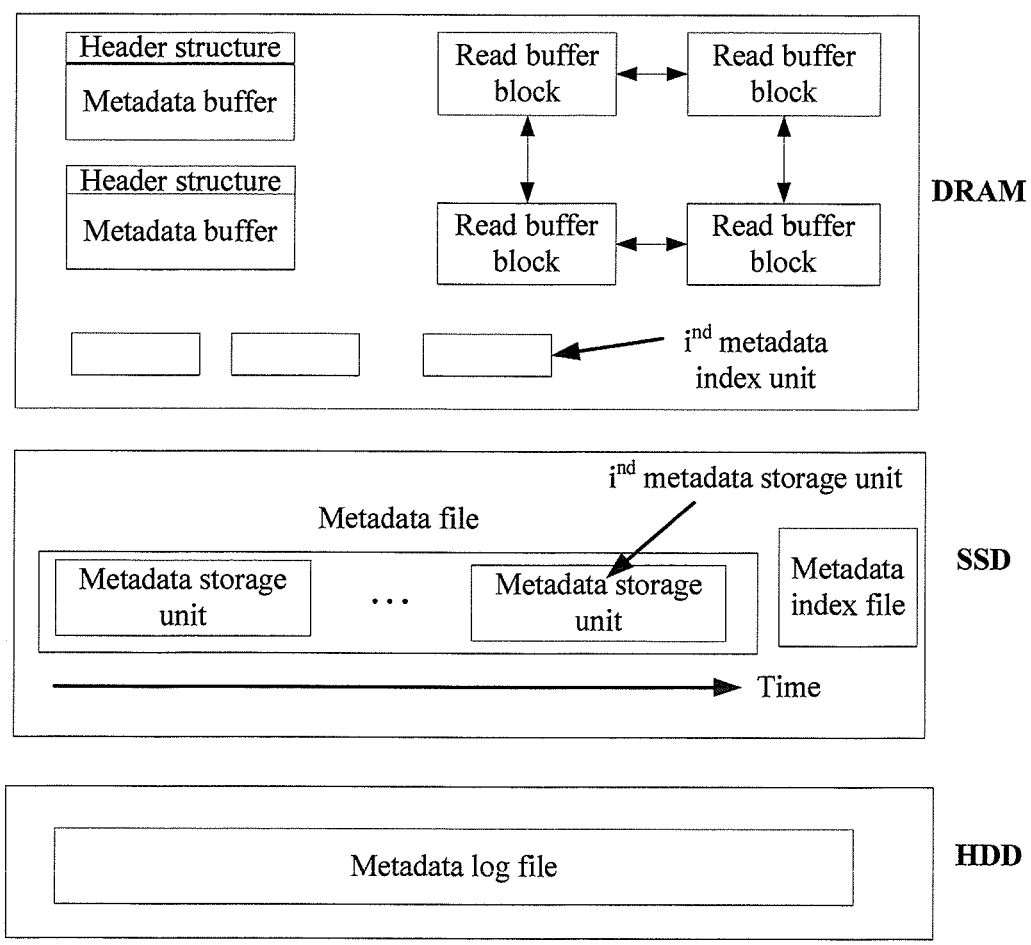
FIG. 1 is a schematic diagram of an architecture of a metadata management system according to an embodiment of the present invention.

FIG. 1 is a metadata storage system for a cluster file system according to an embodiment of the present invention. The system includes a three-tier storage architecture, that is, DRAM+SDD+HDD. The DRAM includes multiple metadata buffers, and each metadata buffer may store written-in metadata information (which may also be called a metadata item) with multiple files or directories. Because size of each metadata item is different, to fast locate metadata in the metadata buffer, each metadata buffer further corresponds to a header structure. The header structure includes a hash table and a Bloom filter (bloom filter, BF) structure. The BF structure uses a bit array to represent a set, which can be used to efficiently judge whether an element belongs to a certain set. The hash table may store information of the metadata in the set, for example, store location information of the element in the set.

Figure 2:
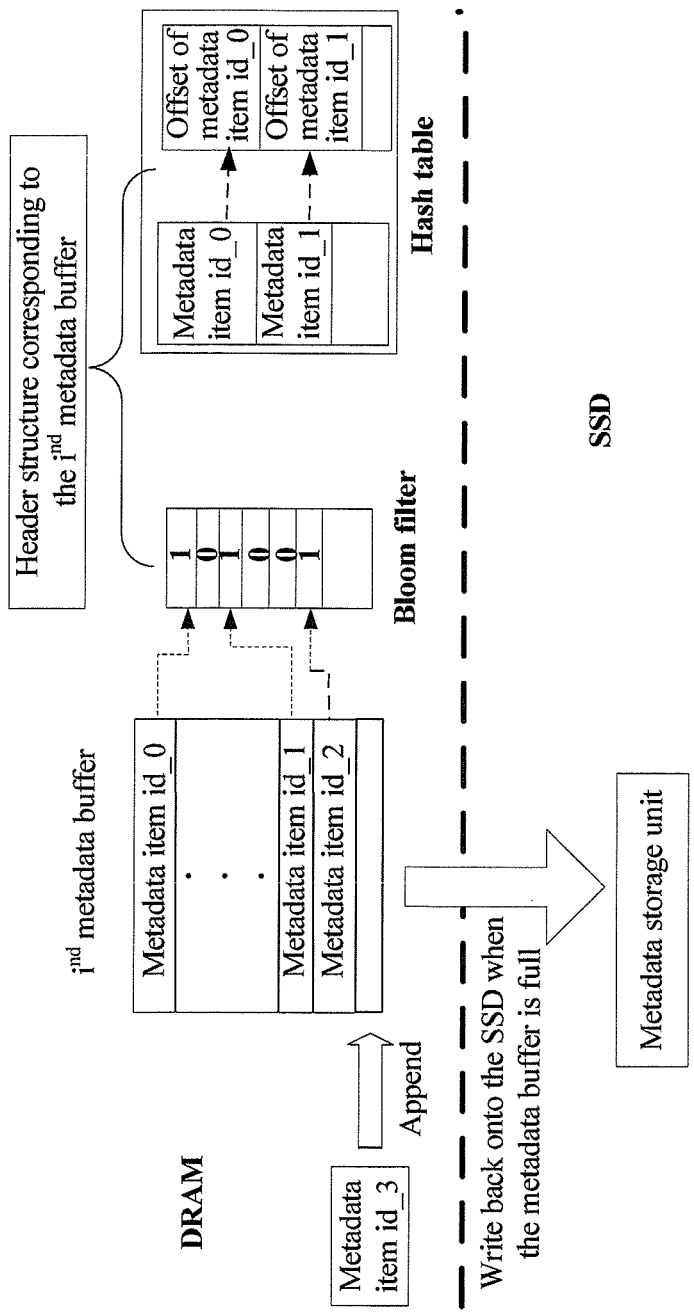
FIG. 2 is a schematic diagram of a header structure of a metadata buffer according to an embodiment of the present invention.

FIG. 2 is a schematic diagram of a header structure according to an embodiment of the present invention. The hash table is used to maintain a mapping between identifiers of the metadata items and offsets of the metadata items in the metadata buffer, and the BF structure is used to record what metadata items are stored in the metadata buffer. As shown in FIG. 2, the header structure includes two data structures, namely, the Bloom Filter and the hash table, where the bloom filter is a bit array formed by 0 and 1, and each 1 corresponds to one metadata item in the metadata buffer. The hash table maintains the mapping relationship between each metadata item in the metadata buffer and the offset of the metadata item in the metadata buffer. With the Bloom Filter, the system may fast determine whether a metadata item is in a certain metadata storage unit; and if yes, the hash table is used to look up the offset of the metadata item, so as to read the metadata item. Therefore, the header structure may be used to fast locate a metadata item in the metadata buffer. In addition, to improve metadata read operation performance, the DRAM further includes a read buffer module, which organizes the read metadata in a manner of an LRU (Least Recently Used, least recently used) linked list.

The DRAM further includes a metadata index unit. The metadata index unit mainly records index information of the metadata which is stored into the SSD. When the data in the metadata buffer is written back into the SSD, the bloom filter and the hash table included in the header structure of the buffer are stored into the DRAM in the manner of metadata index unit. In this way, the metadata index unit may be used to fast locate the metadata on the SSD. The forming process and content of the metadata index unit will be described below with reference to the metadata write operation and the process of storing the metadata into the SSD.

For the metadata write operation, the written-in metadata is firstly stored into the metadata buffer, and then the metadata is written into the metadata buffer in a manner of append write. That is, the metadata is written into the metadata buffer sequentially based on write-in time in a manner similar to writing a log. Each write operation starts from the end location of the last write operation. When a metadata buffer is fully written, it needs to be written back into the SSD. During the process of writing back a certain metadata buffer, the metadata buffer cannot respond to a new metadata item write request, and a new metadata item will be written into another metadata buffer which is not full.

In the SSD, the metadata is stored in a form of a metadata storage unit. When a metadata buffer in the DRAM is fully written, it is written back into the SSD sequentially, to form a new metadata storage unit. The metadata storage unit is organized into a metadata file in a sequence of write-back time. That is, each operation of writing back the metadata buffer is append write. After the metadata is written into the SSD, the metadata in the metadata buffer needs to be released, but the metadata index information (namely, the bloom filter and hash table included in the header structure) in the header structure corresponding to the buffer is stored into the DRAM in a form of a metadata index unit. In this way, each metadata storage unit on the SSD corresponds to one metadata index unit in the DRAM.

In addition, the metadata index unit further includes other information, for example, a mark of an invalid metadata item in the metadata storage unit. The reason is that, the metadata is written into the metadata buffer in a manner of append write without distinguishing between writing new metadata and updating old metadata. Therefore, when the metadata buffer is written back into the SSD, whether the metadata is newly created or updated may be determined according to the identifier of the metadata item in the header structure. If the identifier of the metadata item to be written back into the SSD appears in the metadata index unit, it indicates that the old metadata is updated. Other previous metadata items with the same identifier in the SSD are all invalid, and it is required to make an invalid mark for the metadata items in the metadata index units corresponding to the metadata storage units in which the already invalid metadata items are located, and information about the invalid mark is also stored in the metadata index unit.

When the space of the SSD is insufficient, the invalid metadata items are released, or the metadata items that are not often accessed are migrated to the HDD to be stored.

Compared with the prior art, in this embodiment, for the metadata write operation, the metadata item can be returned as long as it is written into the metadata buffer of the memory, and effects of the metadata buffer write-back operation on the performance are reduced by building a metadata buffer pool. When the metadata buffer is full, the metadata is written into the SSD once sequentially, to form a new metadata storage unit. In this way, multiple times of metadata item write operations with small granularities are converted into a metadata storage unit sequential write operation with large granularities. For the metadata update operation, if the old metadata item on the SSD is updated directly, a large number of small granularity random write may be introduced because the upper layer randomly selects metadata items to be updated and generally the metadata items are small, causing an adverse impact on performance and service life of the SSD. In the foregoing embodiment, the updated metadata item is processed as written-in metadata, directly written into the metadata buffer of the DRAM, and written back into the SSD sequentially after the metadata buffer is full, and a mark is made on the index unit of the metadata storage unit where the already invalid metadata item is located. In this way, the small granularity random write caused by the metadata update operation is converted into a large granularity sequential write operation, which is the same with the metadata write operation. This write operation mode may be adopted to avoid SSD fragmentization, give full play to the performance of the SSD, and ensure the service life of the SDD.

In another embodiment of the present invention, for the purpose of improving reliability, when the metadata buffer is written back, the metadata index information in the header structure may also be written back into the SSD sequentially, and is stored into the metadata index file (meta index file) on the SSD. The metadata storage unit on each SSD corresponds to one metadata index unit in the DRAM. For the purpose of ensuring reliability of the metadata index information, the metadata index unit in the memory may also be copied on the SSD, and is stored into the metadata index file, for re-building the metadata index information in the DRAM when the system fails or restarts.

Another embodiment of the present invention provides a metadata management method for the foregoing metadata storage system. The method mainly includes a step of writing in metadata, a step of reading out the metadata, and a step of migrating the metadata in the foregoing three-tier architecture.

More specifically, the metadata write operation is described above; whether the metadata is newly written or is old and updated, the metadata is written into the metadata buffer sequentially based on write-in time, and each write operation starts from the end location of the last write operation.

For the metadata read operation, a key step is actually the query operation for the metadata item, that is, retrieving the metadata index unit in the DRAM to locate a specific location of the metadata item to be read on the SSD. The BF structure in the metadata index unit is used to determine which metadata storage unit of the SSD the required metadata item is in, and then the hash table is used to determine an internal offset of the metadata item in the metadata storage unit. When the total metadata volume in the system is large, the number of the BFs grows, and the efficiency of linear lookup is low.

Figure 3:
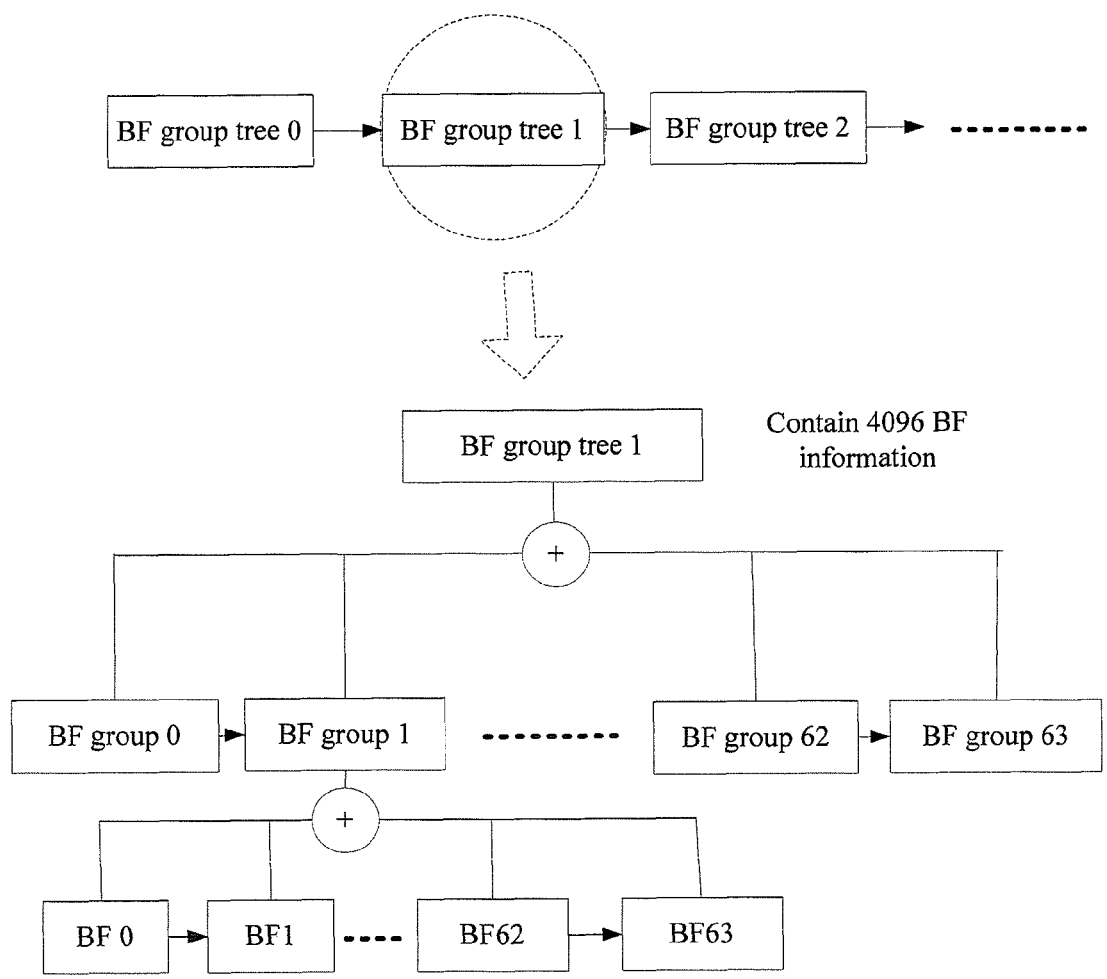
FIG. 3 is a schematic structural diagram of a Bloom filter according to an embodiment of the present invention.

For the purpose of improving the query efficiency of the BF, in an embodiment, the BF structure may be organized in a manner of linked list+64-ary tree. FIG. 3 is a schematic diagram of an architecture of a Bloom filter according to an embodiment of the present invention. As shown in FIG. 3, multiple BFs are divided into groups; each 64 BF groups forms a BF group (Bloom Filter Group); each BF group constitute a 64-ary tree; and a depth of each 64-ary tree is no more than 2 layers, which contains BF information on the 64 leaf nodes. When there are 64 BF groups, the 64 BF groups are organized into a BF group tree (Bloom Filter Group tree), and the BF groups in each BF group tree are organized into a linked list. Therefore, each BF group tree contains 4096 BFs. When the number of BFs further grows, a new BF group tree is organized without increasing the depth of the tree, where the BF group trees therein are also organized into a linked list.

During the lookup, the BF group tree linked list is accessed firstly to determine which tree the metadata item is on, and then the BF in the BF group tree is determined. For the tree organized by BFs, a BF of a non-leaf node is an exclusive OR result of a BF of a child node thereof. In this way, the non-leaf node contains all information of the child node thereof. During the query, if it is found that the metadata item to be queried is not hit in the BF of the non-leaf node, it is unnecessary to query the BF of the child node thereof, and if it indicates that the BF is contained, the child node thereof is successively queried. Compared with the linear lookup, organizing the BFs by using trees may decrease the time complexity for lookup from O(n) to O(log N). When the method of combining the 64-ary tree and the linked list is used, the BF lookup efficiency may be fastened on one hand, and the depth of the BF tree may be controlled on the other hand.

For the metadata migration operation, namely, the steps of migrating metadata in the foregoing three-tier architecture are as follows: When a metadata buffer in the DRAM is fully written, it is written back into the SSD sequentially, to form a new metadata storage unit, and the metadata index information in the header structure corresponding to the buffer is stored into the DRAM in a form of a metadata index unit. Each metadata storage unit on the SSD corresponds to one metadata index unit in the DRAM. The metadata storage unit is organized into a metadata file in a sequence of write-back time. That is, each operation of writing back the metadata buffer is also append write.

Because the SSD storage space is limited, part of metadata may be migrated from the SSD to the HDD periodically or when the SSD space is insufficient. That is, the invalid metadata items are released, or the metadata items that are not often accessed are migrated to the HDD. Similar to the metadata file on the SSD, the metadata migrated out from the SSD is also stored into the HDD in a form of a log file, with a migration granularity of a metadata storage unit. When a metadata storage unit is deleted, the DRAM occupied by the metadata index unit and the space of corresponding items of the metadata index file on the SSD need to be recycled accordingly.

Compared with the prior art, the manner of append write is adopted for the metadata, so the small granularity random write operation on the SSD may be eliminated. The two-level metadata index mechanism of Bloom Filter+hash table is used to fasten the metadata query operation, to make the I/O operation on the SSD meet a characteristic of "large granularity sequential write, and concurrent random read", which gives full play to the performance advantages of the SSD, and ensures the service life of the SDD. In addition, compared with organizing the metadata in a manner of database or multi-level indirect index, the storage space of the SSD is further saved with the metadata organization structure based on append write.

In another embodiment of the present invention, for the purposes of making use of the storage space of the SSD more fully and improving a performance price ratio of the system, a migration operation based on access heat is adopted to perform metadata migration. That is, the feature that the file system metadata has access heat is used, so that the metadata that is often accessed (access heat is high) is stored into the SSD, and the metadata that is not accessed often (access heat is low) is migrated out of the SSD.

Figure 4:
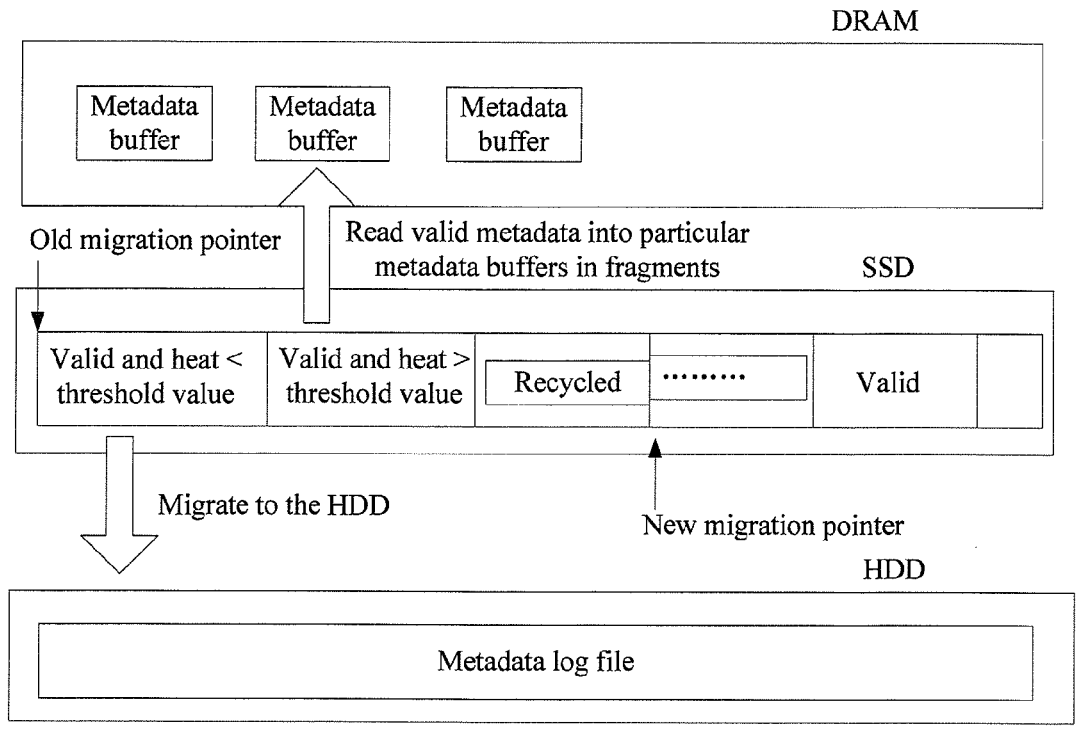
FIG. 4 is a flowchart of a data migration method based on access heat according to an embodiment of the present invention.

FIG. 4 is a schematic flowchart of migrating data from the SSD to the HDD according to an embodiment of the present invention. Data migration is performed in a manner similar to FIFO, and whether the metadata storage unit needs to be migrated is judged by comparing the access heat of the metadata storage unit with a set threshold. When the access heat of the metadata storage unit is larger than the threshold, it is unnecessary to perform migration, otherwise, it is migrated from the SSD to the HDD.

The access heat of each metadata storage unit is calculated by using the following formula:

$$HEAT_{i+1} = u \times \frac{K}{NUM} + (1-u) \times HEAT_i; (0 < u < 1)$$

where $HEAT_{i+1}$ represents current access heat of the metadata storage unit; $HEAT_i$ represents last access heat of the metadata storage unit; u is a value in (0, 1) and is used for controlling effects of the last access heat on the current access heat; K represents times that the metadata storage unit is accessed in a period of time; and NUM represents a metadata read request number sent out by the upper layer totally in a period of time. Therefore, $$\frac{K}{NUM}$$

represents a ratio of times that the metadata storage unit is accessed to the total access in a certain period of time. A higher access ratio indicates that the more often the metadata storage unit is accessed in the period of time and the higher the access heat of the metadata storage unit is.

The access heat of the metadata unit is calculated by using the access ratio in the recent period, which can accurately reflect the access frequency of the data in the recent period, so as to avoid effect of access operations long time before on the current access heat. In addition, the effect of previous access heat on the current access heat is added, thereby preventing the access heat from fluctuation caused by a dramatic change of the access frequency of the metadata storage unit in a short period of time. The system may iteratively calculate the access heat of each metadata storage unit periodically, to enable the access heat to reflect the access situation of the current metadata storage unit. For example, the access heat may be calculated at a fixed time interval, where the time interval may be customized. Through test, when the system is busy, the time interval may be set to be 30 s or shorter.

For the purpose of ensuring simplicity and high efficiency, the parameter K is usually a fixed value, and the parameter u may be adjusted according to the load characteristics. Metadata read requests sent out from the upper layer all have sequence numbers, and the sequence numbers are consecutive. For a certain metadata storage unit, the system records access request sequence numbers in recent K times, and the number NUM of the metadata read requests sent by the upper layer in the period when the metadata is accessed for K times may be obtained from a difference between sequence numbers of the $K^{nd}$ access and the first access. If the access heat of the metadata storage unit is calculated in this method, the system only needs to record a very small amount of data, and the calculation is highly efficient.

After the access heat of each metadata storage unit in the system is understood, the metadata storage units with low access heat are migrated out of the SSD in a manner similar to first in first out (First In First Out, FIFO). The migration operation may be implemented by a background migration thread.

The migration threshold is set mainly based on the metadata access characteristics. For an application with strong metadata access spatial locality, the threshold may be set to be a large value. Each migration operation starts from the file header of the metadata file on the SSD, and after the migration is completed, the location of the file header of the metadata file is adjusted. Before migration for a certain metadata storage unit, a manner of threshold judgment is adopted. If the heat thereof is smaller than the threshold, it is necessary to migrate the metadata storage unit out of the SSD, and store it into the metadata log file of the HDD. If the heat of the metadata storage unit is more than the threshold, it indicates that the metadata stored by the metadata storage unit is often accessed, and still needs to be stored on the SSD. Therefore, the metadata storage unit is read into the memory, valid metadata items thereof are written into the metadata buffer, and the space of the metadata storage unit on the SSD may be reused. As the metadata buffer is written back, the metadata that is often accessed in the metadata storage unit returns back into the SSD. In this way, the SSD available space for each migration operation may be ensured to be consecutive, and so when the system writes back the metadata buffer, sequential write operations with large granularity are performed. The foregoing migration step may also be performed by using a specialized migration thread.

In another embodiment, the foregoing migration operation further includes an operation of periodically recycling the SSD space occupied by the invalid metadata items. Because the metadata update operation adopts a policy of non-local update, the metadata storage unit may contain invalid metadata items. The invalid metadata items are recorded on the index unit corresponding to the metadata storage unit, and a ratio of the invalid metadata in the metadata storage unit may be calculated through the metadata index unit corresponding to the metadata storage unit. The migration thread may periodically recycle the metadata storage units with a ratio of the invalid metadata items over 50%. During the recycling, the whole metadata storage unit is read into the memory, and the valid metadata items are placed into the metadata buffer, and then a corresponding mark is made for the metadata storage unit. For the purpose of preventing a hole in the metadata files, this space cannot be used at this time. When the migration thread migrates to the metadata storage unit, the migration thread directly recycles the space occupied by the metadata storage unit without judging its access heat.

In another embodiment, the migration operation adopts a manner of combining periodical startup and threshold-based startup. To ensure the metadata write operation performance, a certain amount of space should be available on the SSD, and so the migration thread may be periodically started. The startup period of the migration thread should be based on the load of the metadata write operation of the system. For the application with a heavy metadata write load, the startup period should not be shorter than 30 minutes. In addition, when the SSD available space is smaller than a certain threshold (the threshold is an empirical value, and generally the threshold should be between 15% and 20%), the migration operation also needs to be started. The threshold should be set in combination with the pressure of the upper layer write request and the efficiency of the SSD data migration. After the migration thread obtains certain space, the migration thread may stop, so as to prevent adverse impact of the migration operation on the metadata I/O operation.

Compared with the prior art, through the data migration operation based on access heat, the metadata that is often accessed may be left on the SSD, to improve space usage efficiency of the SSD. The access heat judging algorithm in the foregoing embodiment combines the data access frequency and the recent access time, and is accurate in judgment and small in time and space overhead. By using the SSD data migration operation based on access heat, the SSD storage space may be used fully, and the system performance price ratio is improved. However, in the existing data migration mechanism based on the SSD+HDD architecture, for example, BtrFS, the access heat is judged by performing statistics for each I/O operation information, the data with higher heat is placed into the SSD, and data with lower heat is placed into the HDD. Such a heat judgment is accurate, but it needs to record relevant information of each I/O operation, and so the time and space overhead is quite large, making it unsuitable for the metadata storage system of the cluster file system with a large metadata volume.

Another embodiment further provides a cluster file system, and the system adopts the foregoing metadata storage system and the metadata management method to store and manage the metadata.

To analyze the performance in a better way, the inventors performed the following test.

The inventors realized the foregoing metadata storage system and management method based on a cluster file system HVFS of Sugon 6000, to improve the performance of HVFS, and the improved HVFS is called Hybrid HVFS. The Hybrid HVFS is compared with the HVFS that adopts the same metadata storage architecture (namely, adopting the existing DRAM+SSD+HDD architecture to store metadata).

Figure 5:
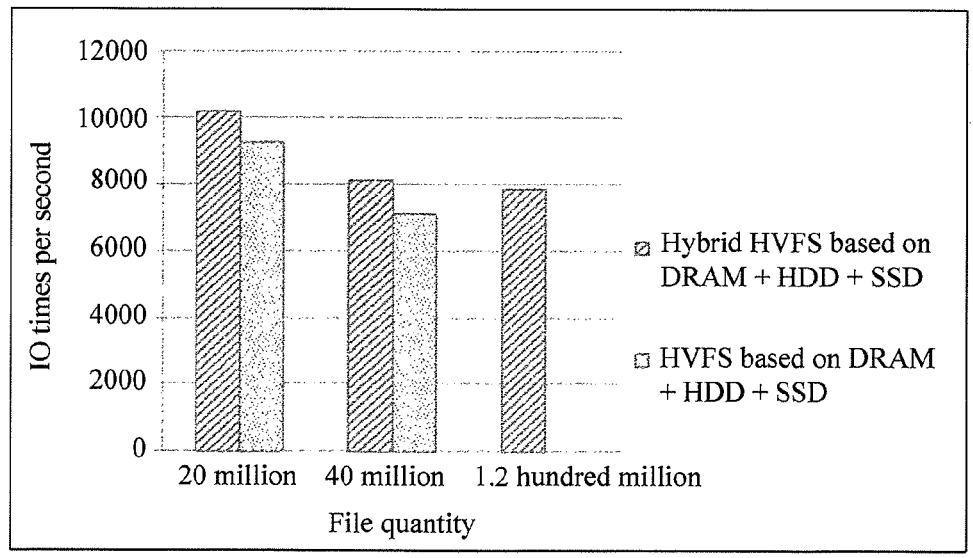
FIG. 5 is a schematic comparison diagram of metadata create operation performance in a cluster file system before and after the metadata management method of the present invention is adopted.
Figure 6:
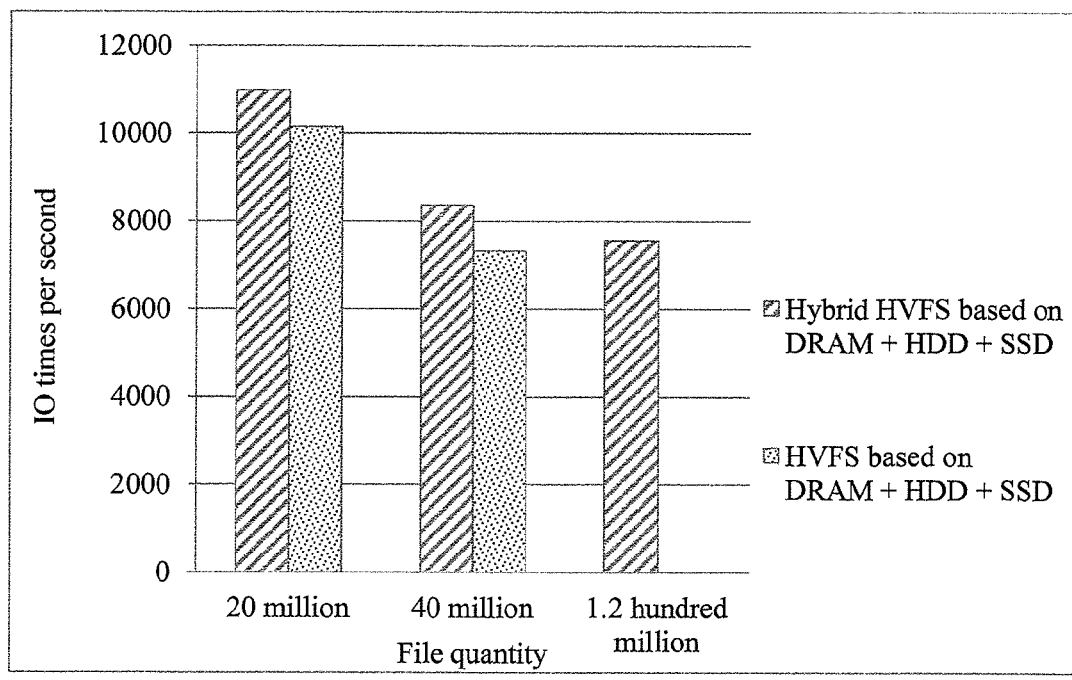
FIG. 6 is a schematic comparison diagram of metadata query operation performance in a cluster file system before and after the metadata management method of the present invention is adopted.

Taking metadata create (create system invoke) and lookup (lookup system invoke) as an example, I/O operation times completed per second (IOPS, Input/Output Per Second) are compared. FIG. 5 and FIG. 6 respectively are schematic comparison diagrams of metadata create operation and query operation performance between the original HVFS and the improved Hybrid HVFS. It can be seen from FIG. 5 and FIG. 6 that because the Hybrid HVFS adopts the metadata management method in the foregoing embodiment, the metadata operation performance of the cluster file system can be improved significantly.

The test result indicates that, when the metadata management method of the present invention is used, the metadata operation performance of the cluster file system may be significantly improved. In addition, the data migration policy based on access heat may keep more metadata that is often accessed on the SSD, thereby improving the read operation performance of the metadata.

Though the present invention is described with reference to exemplary embodiments, the present invention is not limited to the embodiments described herein. The present invention further includes various changes and variations without departing from the scope of the present invention.

What is claimed is:

1. A metadata storage system in a cluster file system, comprising:
   a Dynamic Random Access Memory (DRAM);
   a Solid-state Drive (SDD);
   wherein the DRAM comprises multiple metadata buffers; metadata in each metadata buffer is written sequentially based on write-in time, each metadata buffer corresponds to a header structure for storing metadata index information of the buffer; a new first metadata index unit is formed in the DRAM each time data in a first metadata buffer is written back into the SSD, to store a metadata index information comprised in a header structure of the first metadata buffer; and
   wherein the SSD comprises a metadata file, and the metadata file comprises multiple metadata storage units organized in a sequence of write-back time; a new first metadata storage unit is formed in the SSD each time the data in the first metadata buffer is written back into the SSD, to store the metadata written into the SSD from the first metadata buffer; and the first metadata storage unit corresponds to the first metadata index unit in the DRAM, wherein the first metadata buffer is anyone of the multiple metadata buffers in the DRAM.

2. The metadata storage system according to claim 1, further comprising a Hard Disk Drive (HDD) for storing metadata from the SSD.

3. The metadata storage system according to claim 1, wherein the header structure corresponding to the first metadata buffer comprises a Bloom Filter and a hash table, the Bloom Filter is used to record what metadata items are stored in the first metadata buffer, and the hash table is used to maintain a mapping between identifiers of the metadata items and offsets of the metadata items in the first metadata buffer.

4. The metadata storage system according to claim 1, wherein the SSD further comprises a metadata index file for storing the metadata index information.

5. The metadata storage system according to claim 1, wherein the DRAM further comprises a read buffer module, configured to buffer metadata read from the SSD.

6. A metadata management method for a metadata storage system, comprising followed steps, wherein the metadata storage system comprises a dynamic random access memory (DRAM) and a solid state drive (SSD), and the DRAM comprises multiple metadata buffers with each metadata buffer corresponding to a header structure for storing metadata index information of the buffer, the method comprising:
   writing metadata sequentially into a first metadata buffer in the DRAM based on write-in time; and
   when a first metadata buffer is fully written, writing the metadata in the first metadata buffer back into the SSD sequentially to form a new first metadata storage unit, and storing corresponding metadata index information in the header structure corresponding to the first metadata buffer into the DRAM in a form of a metadata index unit, wherein the first metadata storage unit corresponds to the first metadata index unit in the DRAM, the metadata storage unit is organized into a metadata file in a sequence of write-back time, and the first metadata buffer is any one of the multiple metadata buffers in the DRAM.

7. The method according to claim 6, wherein the header structure corresponding to the first metadata buffer comprises a Bloom Filter and a hash table, the Bloom Filter is used to record what metadata items are stored in the first metadata buffer, and the hash table is used to maintain a mapping between identifiers of the metadata items and offsets of the metadata items in the first metadata buffer.

8. The method according to claim 6, wherein writing the metadata in the first metadata buffer back into the SSD further comprises writing the corresponding metadata index information back into a metadata index file on the SSD sequentially when the metadata in the first metadata buffer is written back into the SSD sequentially.

9. The method according to claim 7, wherein writing the metadata in the first metadata buffer back into the SSD further comprises:

determining which data items on the SSD are already invalid according to the identifiers of the metadata items in the header structure when the metadata in the first metadata buffer is written back into the SSD; and making an invalid mark for the metadata items in the first metadata index units corresponding to the first metadata storage units in which the already invalid metadata items are located.

10. The method according to claim 7, wherein the Bloom Filter is organized in a manner of combining a 64-ary tree and a link, a depth of each 64-ary tree is no more than 2 layers, and multiple 64-ary trees form a linked list, wherein a Bloom Filter corresponding to a non-leaf node of each 64-ary tree is an exclusive OR result of a Bloom Filter of a child node thereof.

11. The method according to claim 9, further comprising determining whether to migrate the metadata storage unit from the SSD to the HDD, wherein the metadata storage system further comprises a HDD, wherein determining whether to migrate the metadata storage unit from the SSD to the HDD comprises:

comparing access heat of the first metadata storage unit with a preset threshold to determine whether the first metadata storage unit needs to be migrated; and when the access heat of the first metadata storage unit is smaller than the preset threshold, migrating the first metadata storage unit from the SSD to the HDD, otherwise writing valid metadata items in the first metadata storage unit into the metadata buffer in the DRAM.

12. The method according to claim 10, wherein the access heat of the metadata storage unit is calculated by using the following formula:

$$HEAT_{i+1} = u \times \frac{K}{NUM} + (1-u) \times HEAT_i; (0 < u < 1)$$

wherein $HEAT_{i+1}$ represents current access heat of the first metadata storage unit; $HEAT_i$ represents last access heat of the first metadata storage unit; u is a value in (0, 1) and is used for controlling effects of the last access heat on the current access heat; K represents times that the first metadata storage unit is accessed in a period of time; and NUM represents a number of requests received in the period of time to read the first metadata from the SSD; wherein the threshold is set according to metadata access characteristics.

13. The method according to claim 11, further comprising:

directly migrating the first metadata storage units with a ratio of invalid metadata items over 50% from the SSD to the HDD without judging access heat thereof.

14. The method according to claim 11, wherein when a ratio of SSD available space to the SSD total space is smaller than a certain space threshold, determining whether to migrate the first metadata storage unit from the SSD to the HDD.

15. The method according to claim 14, wherein the space threshold ranges between 15% and 20%.

16. The method according to claim 11, wherein migrating the metadata storage unit from the SSD to the HDD is performed at a fixed time interval.

17. A cluster file system, comprising a metadata storage system comprising:

a Dynamic Random Access Memory (DRAM);

a Solid-state Drive (SDD);

wherein the DRAM comprises multiple metadata buffers; metadata in each metadata buffer is written sequentially based on write-in time, each metadata buffer corresponds to a header structure for storing metadata index information of the buffer; a new first metadata index unit is formed in the DRAM each time data in a first metadata buffer is written back into the SSD, to store a metadata index information comprised in a header structure of the first metadata buffer; and wherein the SSD comprises a metadata file, and the metadata file comprises multiple metadata storage units organized in a sequence of write-back time; a new first metadata storage unit is formed in the SSD each time the data in the first metadata buffer is written back into the SSD, to store the metadata written into the SSD from the first metadata buffer; and the first metadata storage unit corresponds to the first metadata index unit in the DRAM, wherein the first metadata buffer is anyone of the multiple metadata buffers in the DRAM.

\* \* \* \* \*